(12) United States Patent
Nunnink et al.

(10) Patent No.: US 10,754,071 B2
(45) Date of Patent: Aug. 25, 2020

(54) SYSTEMS AND METHODS REDUCE TEMPERATURE INDUCED DRIFT EFFECTS ON A LIQUID LENS

(71) Applicant: COGNEX CORPORATION, Natick, MA (US)

(72) Inventors: Laurens Nunnink, Simpelveld (NL); Mario Joußen, Wollersheim (DE)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/375,859

(22) Filed: Dec. 12, 2016

(65) Prior Publication Data

US 2017/0090076 A1   Mar. 30, 2017

Related U.S. Application Data

(62) Division of application No. 14/145,185, filed on Dec. 31, 2013, now Pat. No. 9,575,221.

(51) Int. Cl.
| | |
|---|---|
| G02B 1/06 | (2006.01) |
| G02B 3/14 | (2006.01) |
| G02B 7/00 | (2006.01) |
| G02B 7/08 | (2006.01) |
| G02B 7/02 | (2006.01) |
| G02B 26/00 | (2006.01) |

(52) U.S. Cl.
CPC .............. G02B 3/14 (2013.01); G02B 7/008 (2013.01); G02B 7/028 (2013.01); G02B 7/08 (2013.01); G02B 26/004 (2013.01)

(58) Field of Classification Search
CPC ....................................................... G02B 3/14
USPC ......................................................... 359/666
See application file for complete search history.

(56) References Cited

U.S. PATENT DOCUMENTS

| | | | |
|---|---|---|---|
| 4,838,665 | A | 6/1989 | Hasegawa et al. |
| 7,248,796 | B2 | 7/2007 | Triteyaprasert et al. |
| 7,264,162 | B2 | 9/2007 | Barken |
| 7,296,749 | B2 | 11/2007 | Massieu |
| 7,312,929 | B2 | 12/2007 | Choi et al. |
| 7,443,597 | B2 | 10/2008 | Humpston |
| 7,755,841 | B2 | 7/2010 | Christenson et al. |

(Continued)

FOREIGN PATENT DOCUMENTS

| | | |
|---|---|---|
| CN | 1947044 A | 4/2007 |
| CN | 101144913 A | 3/2008 |

(Continued)

*Primary Examiner* — James C. Jones
(74) *Attorney, Agent, or Firm* — Quarles & Brady LLP

(57) ABSTRACT

Systems and methods reduce temperature induced drift effects on a liquid lens used in a vision system. A feedback loop receives a temperature value from a temperature sensor, and based on the received temperature value, controls a power to the heating element based on a difference between the measured temperature of the liquid lens and a predetermined control temperature to maintain the temperature value within a predetermined control temperature range to reduce the effects of drift. A processor can also control a bias signal applied to the lens or a lens actuator to control temperature variations and the associated induced drift effects. An image sharpness can also be determined over a series of images, alone or in combination with controlling the temperature of the liquid lens, to adjust a focal distance of the lens.

20 Claims, 8 Drawing Sheets

(56) References Cited

U.S. PATENT DOCUMENTS

| | | |
|---|---|---|
| 7,911,526 B2 | 3/2011 | Kageyama |
| 8,164,682 B2 | 4/2012 | Border et al. |
| 8,487,228 B2 | 7/2013 | Nunnink |
| 8,864,035 B2 | 10/2014 | Fukuba |
| 2005/0264802 A1 | 12/2005 | Shibata et al. |
| 2007/0279757 A1* | 12/2007 | Renders .................. G02B 3/14 359/665 |
| 2008/0144185 A1 | 6/2008 | Wang et al. |
| 2008/0144186 A1 | 6/2008 | Feng |
| 2008/0277480 A1 | 11/2008 | Thuries et al. |
| 2009/0302197 A1 | 12/2009 | Uchino |
| 2011/0200314 A1 | 8/2011 | Kawashima |
| 2011/0235177 A1 | 9/2011 | Dube |
| 2012/0037820 A1* | 2/2012 | Komi ...................... G02B 3/14 250/566 |
| 2012/0200686 A1 | 8/2012 | Yu et al. |
| 2013/0148059 A1* | 6/2013 | Park ................... G02F 1/13306 349/72 |
| 2014/0268361 A1 | 9/2014 | Nunnink |

FOREIGN PATENT DOCUMENTS

| | | |
|---|---|---|
| CN | 101494737 A | 7/2009 |
| CN | 101541367 A | 9/2009 |
| CN | 101840055 A | 9/2010 |
| CN | 102436018 A | 5/2012 |
| WO | 2008024821 A2 | 2/2008 |
| WO | 2009011384 A1 | 1/2009 |
| WO | 2012160613 A1 | 11/2012 |

* cited by examiner

# SYSTEMS AND METHODS REDUCE TEMPERATURE INDUCED DRIFT EFFECTS ON A LIQUID LENS

CROSS-REFERENCE TO RELATED APPLICATIONS

This application is a divisional of pending U.S. patent application Ser. No. 14/145,185, filed Dec. 31, 2013, and entitled "SYSTEMS AND METHODS REDUCE TEMPERATURE INDUCED DRIFT EFFECTS ON A LIQUID LENS," the entire contents of which are incorporated herein by reference.

STATEMENT REGARDING FEDERALLY SPONSORED RESEARCH OR DEVELOPMENT

Not applicable.

BACKGROUND OF THE TECHNOLOGY

The present technology relates to adjustable lenses used in a lens system, and more specifically, to systems and methods for reducing temperature induced drift effects on a microfluidic or liquid lens used in a vision system.

Vision systems have been developed for many different applications. For example, machine vision systems have been developed for reading bar codes and other types of symbols placed on packages or products to obtain information there from. Other machine vision systems have been developed for inspecting manufactured parts for features/characteristics.

Many vision systems include a camera for obtaining images of symbols or items to be imaged. A processor receives the images and extracts information that can then be used to perform one or more vision processes. In many applications, the distance between a camera sensor and a symbol or item to be imaged can vary between uses. In these cases, in order to obtain useful images, i.e., images from which data required to complete machine vision processes can be extracted, an adjustable lens and/or auto-focus system is often provided. In these cases, when the system is activated to perform a vision process, the lens and auto-focus system automatically focus the lens so that a clear image of the symbol or item to be imaged is generated on the camera sensor. After the focusing process is completed, a clear image of the symbol or item to be imaged is obtained and is processed to complete the vision process.

One type of adjustable lens that can be used in a machine vision system is a liquid lens. Liquid lenses are constructed of one or more fluids of different refractive indexes, and can be varied by controlling the meniscus, or surface of the liquid. In one type of liquid lens, for example, two fluids are contained in a tube with transparent end caps. The first is an electrically conducting aqueous solution, and the second is a non-conducting oil. The interior of the tube is coated with a hydrophobic material, which causes the aqueous solution to form a hemispherical lens which can be adjusted by applying a DC voltage across the coating to decrease its water repellency in a process called electrowetting. Electrowetting adjusts the surface tension of the liquid, which changes the radius of curvature and adjusts the focal length of the lens. Several liquid lens configurations utilizing an electrowetting process are known.

Another type of adjustable liquid lens utilizes an electrical/mechanical actuator system to induce movement to adjust the focus of the lens. For example, a voice coil type adjustable lens has a ring shaped voice coil actuator that presses onto a transparent membrane serving as a transparent sidewall of a container. The container is filled with a transparent liquid. A current applied through the actuator induces the actuator to apply a force to deform the membrane into a convex shape. The convex shape acts as the lens, and can be adjusted by adjusting the current.

Liquid lenses are extremely versatile, providing a highly variable focal length, and some without the need for moving parts. Liquid lenses, however, are inherently subject to undesirable changes in focal length (referred to herein as drift) due to temperature changes and aging of the liquids in the lens. Temperature and aging can, for example, alter the refractive index of the liquids, or the dielectric constant, thereby changing the focal length. For example, when small symbols are imaged at a fixed large distance, a temperature drift of the lens will cause blur in the image and decrease reading performance. This undesirable drift causes the liquid lens at a first temperature to have a first focal length, and the same liquid lens at a second temperature would have a second focal length different from the first focal length.

For adjustable lenses that use a current applied through the actuator to adjust the focus of the lens, the current applied through the actuator not only heats the actuator, but the lens heats up as well. Undesirably, this causes the temperature of the lens to vary with the applied control current. At large optical power (close object distances) the lens will heat up more than when used at small optical power (large object distance) due to the higher current need for the larger optical power.

Attempts have been made to compensate for liquid lens drift. These attempts measure the thermal behavior of the liquid lens during a calibration process, and then compensate the lens at normal operation based on the measured thermal behavior by adjusting the liquid lens driver voltage or current. This not only requires a time consuming calibration process for each lens, but the measured thermal behavior is made based on a typical drift behavior during calibration, which has limited accuracy.

Therefore, when using a variable lens in applications that induce changes in the temperature of the lens, the focusing of the variable lens will produce different results at different temperatures. For these applications, other systems and methods must be used in an attempt to maintain a more consistent focal length and a sharper resulting image. The present technology addresses solutions to these issues.

BRIEF SUMMARY OF THE TECHNOLOGY

The present technology provides systems and methods for reducing temperature induced drift effects on a liquid lens used in a vision system. A processor can receive a temperature value from a temperature sensor, and based on the received temperature value, energize or de-energize a heating element on at least one circuit board to maintain the temperature value within a predetermined control temperature range to reduce the effects of drift. The processor can also control a bias signal applied to the lens or a lens actuator to control temperature variations and the associated induced drift effects. An image sharpness can also be determined over a series of images, alone or in combination with controlling the temperature of the liquid lens, to adjust a focal distance of the lens.

In one aspect, the present technology provides vision systems and methods for maintaining the temperature of the liquid lens at a control temperature, thereby reducing drift effects on the liquid lens. The vision system includes an adjustable focus liquid lens having a field of view. At least one circuit board is in thermal contact with at least a portion of the liquid lens. A heating element is positioned on the at least one circuit board, the heating element controllable to heat the at least one circuit board. A temperature sensor is positioned to measure a temperature value of the liquid lens. A feedback loop controls a power to the heating element based on a difference between the measured temperature of the liquid lens and a predetermined control temperature.

In other aspects, the present technology provides vision systems and methods for controlling a bias signal to the liquid lens to control the temperature of the liquid lens. The vision system includes an adjustable focus liquid lens having a field of view, the focus of the liquid lens being adjustable with a control signal applied to the liquid lens for capture of an image. A bias signal is applied to the liquid lens when the liquid lens is not adjusted with the control signal for capture of the image. The bias signal being applied to the liquid lens to control a temperature of the liquid lens.

In some embodiments, the bias signal can be controlled in relation to an average dissipation of heat from the liquid lens. In other embodiments, the bias signal can be dependent on a sensed temperature value of the liquid lens or ambient temperature.

Other embodiments comprise systems and methods that optimize the focal distance of an adjustable lens in a vision system, the vision system having a field of view. The method comprises several steps including adjusting the focal distance of the adjustable lens by a predetermined adjustment step; acquiring a first image of the field of view that includes a region of interest; calculating a first sharpness score for the region of interest that is within the first image of the field of view; adjusting the focal distance of the adjustable lens by the predetermined adjustment step; acquiring another image of the field of view that includes the region of interest; calculating another sharpness score for the region of interest that is within the another image of the field of view; comparing the first sharpness score with the another sharpness score; and defining a direction of a next adjustment step in the focus distance based on the comparison.

Yet other embodiments comprise systems and methods that optimize the focal distance of an adjustable lens in a vision system, the vision system having a field of view. The method comprises several steps including adjusting the focal distance of the adjustable lens by a predetermined adjustment step; acquiring a first image of the field of view; measuring a first ambient temperature near the adjustable lens; adjusting the focal distance of the adjustable lens by the predetermined adjustment step; acquiring another image of the field of view; measuring another ambient temperature near the adjustable lens; comparing the first ambient temperature with the another ambient temperature; and defining a direction of a next adjustment step in the focus distance based on the comparison.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

BRIEF DESCRIPTION OF THE SEVERAL VIEWS OF THE DRAWINGS

FIG. 9 is a chart showing relative positions a liquid lens is driven to, and the associated default positions the lens is returned to;

Figure 1:
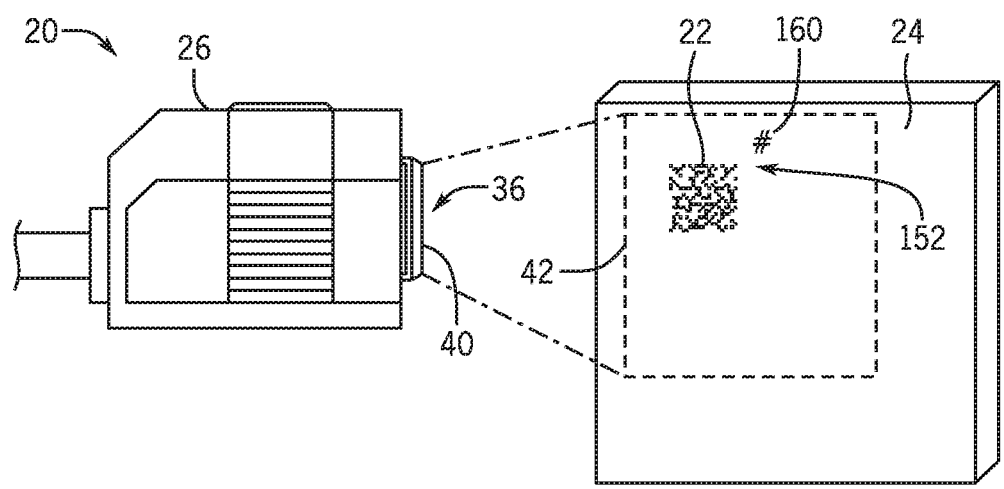
FIG. 1 is a perspective view of a fixed-mount reader device obtaining an image of a symbol on an item of interest according to embodiments of the technology.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "method" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, on which configuration data and programs may be stored and/or data communications may be buffered. The term "memory" may also include other types of known or future developed memory or combinations thereof.

Embodiments of the technology are described below by using diagrams to illustrate either the structure or processing of embodiments used to implement the present technology. Using the diagrams in this manner to present embodiments of the technology should not be construed as limiting of its scope. The present technology contemplates systems and methods for reducing and/or controlling temperature induced drift effects on an adjustable lens, and improving image quality.

The various embodiments will be described in connection with a liquid lens as part of a fixed-mount symbol reader, the reader adapted to acquire an image of an object and/or a mark on the object. That is because the features and advantages of the technology are well suited for this purpose. Still, it should be appreciated that the various aspects of the technology can be applied in other forms of electronic devices and is not limited to use of a liquid lens as part of a reader, as it will be understood that a wide variety of electronic devices that incorporate a heat sensitive lens may benefit from reducing temperature induced drift according to the features described herein.

Referring now to the drawings wherein like reference numerals correspond with similar elements throughout the several views and, more specifically, referring to FIG. 1, the present technology will be described in the context of an exemplary fixed mount symbol reader 20 that can be used to obtain images of symbols, e.g., two dimensional symbol 22, placed on a surface of an item 24 and that can decode the symbols in the obtained images. While the technologies herein are described in the context of a fixed-mount symbol reader 20, for example where a conveyor moves items or packages of various sizes through the field of view of the reader 20 such that the distance between the reader lens/sensor and the surface of a package or item on which the symbol is applied may vary item to item, it should be appreciated that the technologies may also be useful in hand-held symbol readers as well as stationary cameras, as non-limiting examples.

Figure 2:
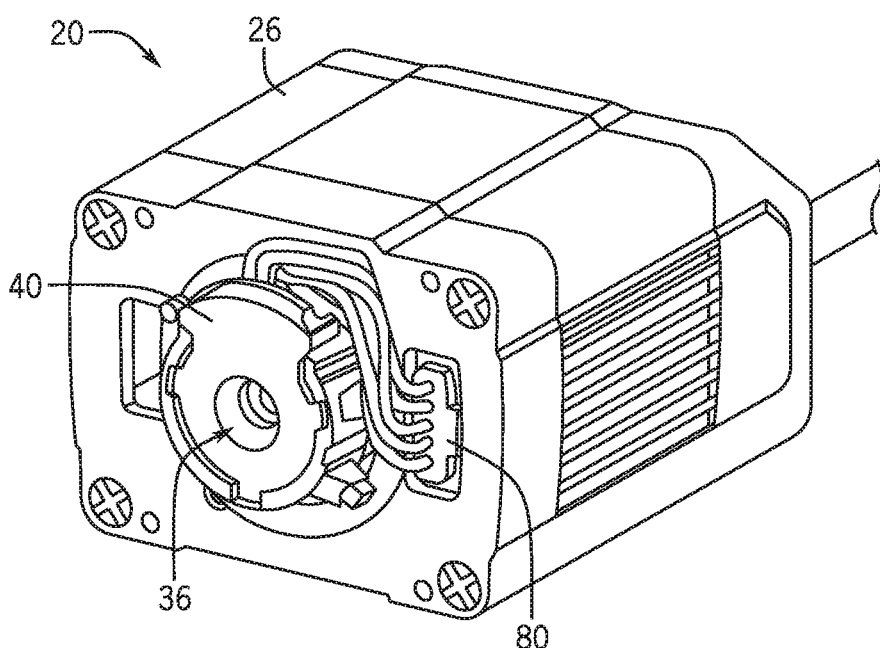
FIG. 2 is a perspective view of the fixed-mount reader device illustrating a front end of the reader device.

Referring now to FIGS. 1 and 2, reader 20 can include a metal or rigid plastic housing 26. An adjustable focal length lens 36 can be provided behind a lens housing 40 positioned near the distal end of the reader housing 26, and has a field of view 42. Lens 36 can be a known multi-focal liquid lens that is commercially available. In these types of lenses, the focal length is adjusted by varying a control signal applied to the liquid lens.

Figure 3:
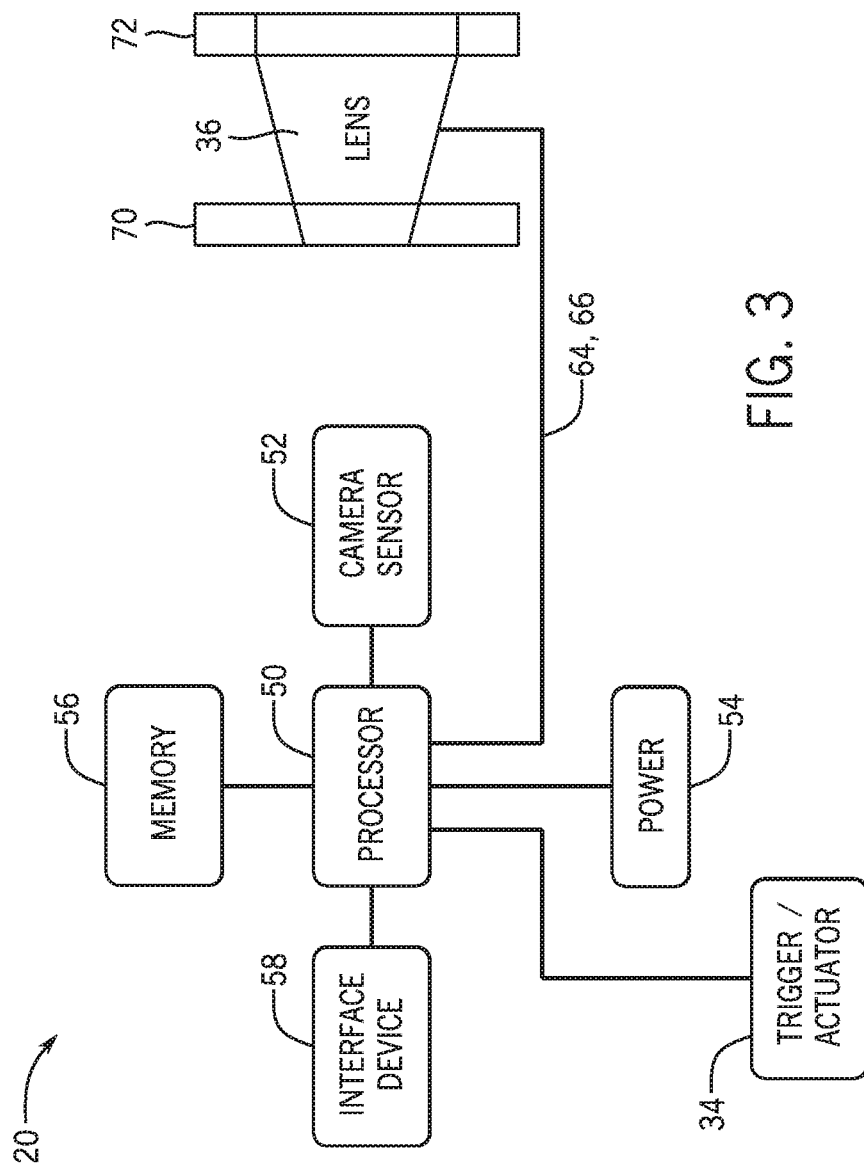
FIG. 3 is a schematic diagram illustrating components that can comprise the reader device of FIGS. 1 and 2.

Referring now to FIG. 3, in addition to the components described above with respect to FIGS. 1 and 2, reader 20 can include a processor 50, a camera sensor 52, a power source 54, memory 56, and one or more interface devices 58, such as an audible sound generator, an LED for indicating successful symbol decoding, wireless and/or wired communications, etc. As would be known, the power source 54 could be replaced with a battery to provide power. Processor 50 can be coupled to memory 56 where programs performed by processor 50 can be stored. In addition, processor 50 can direct the storage of images obtained via camera sensor 52 in the memory 56. Processor 50 can also be coupled to camera sensor 52 for receiving image data there from. Known trigger/actuator devices or methods 34 can be coupled to or performed by processor 50 for initiating a symbol reading process. Processor 50 can also be coupled to the variable focus liquid lens 36 for modifying the focus position or focal length of the liquid lens 36.

In typical operation, the reader 20 is positioned such that the camera or lens field of view 42 is directed toward a surface of the item 24 on which the symbol 22 has been applied so that the symbol 22 is disposed within the reader's field of view 42. Once so positioned, the trigger 34 can be activated causing reader 20 to obtain one or more images of the symbol 22 within the field of view 42. Once a suitably focused image of symbol 22 has been obtained, the processor 50 within reader 20, or using the communication interface 58, a processor remote from the reader 20, can attempt to decode the symbol 22 and can then provide the decoded information to other software applications for use. In addition, after successful decoding of the symbol 22, reader 20 may provide an indication to the user that decoding has been successful. Here, although not illustrated in FIG. 1 or 2, the indication of successful decoding may be provided via an audible beep or noise or via illumination of an LED or the like, or both.

Liquid lenses, such as liquid lens 36, are typically constructed of one or more fluids of different refractive indexes, and can be varied by controlling the meniscus, or surface of the liquid. Liquid lenses can be adjusted by application of a control signal 64 to the liquid lens or to a liquid lens actuator. The control signal 64 can comprise a control voltage or a control current, for example. In some types of known liquid lens, for example, two fluids are contained in a tube with transparent end caps. The first is an electrically conducting aqueous solution, and the second is a non-conducting oil. The interior of the tube is coated with a hydrophobic material, which causes the aqueous solution to form a hemispherical lens that can be adjusted by applying a DC voltage across the coating to decrease its water repellency in a process called electrowetting. Electrowetting adjusts the surface tension of the liquid changing the radius of curvature and adjusting the focal length of the liquid lens.

As discussed above, the optical properties of liquid lenses differ from those of typical glass or plastic lenses. The optical power of a liquid lens, for example, decreases as the temperature of the lens increases, and as the lens ages. When focusing the liquid lens, moreover, there is hysteresis between the control signal 64 and the optical power. That is, as the control signal 64 is increased and decreased, the incremental change in optical power varies, which can detrimentally affect feedback loops.

Embodiments of the technology control the temperature of the adjustable lens 36 so as to reduce the drift effects caused by changes in the lens temperature. To minimize the drift effects, the application of heat can be controlled alone or in combination with controlling aspects of a bias signal 66 to the lens 36 or a lens actuator 96. As described below, the control signal 64 can be removed between the acquisition of consecutive images. The bias signal 66 can be applied in place of the control signal 64. The bias signal 66 can comprise a bias voltage or a bias current, for example. Adjustments can be made in the level of the bias signal 66 and the length of time the bias signal is applied. When adjustments are made in this way, the effects of temperature, both ambient temperature and lens temperature, can be counteracted.

Generally, higher temperatures cause the optical power of the liquid lens 36 to decrease. In this example, current methods increase the focal distance of the reader 20 to adjust for the decrease in optical power. A change in focal distance can be used to compensate for the effect of temperature on the liquid lens, but any time the liquid lens focus is changed, there is risk associated with reducing the sharpness of the images acquired due to the uncertainty of the exact focus the liquid lens should be adjusted to.

Figure 4:
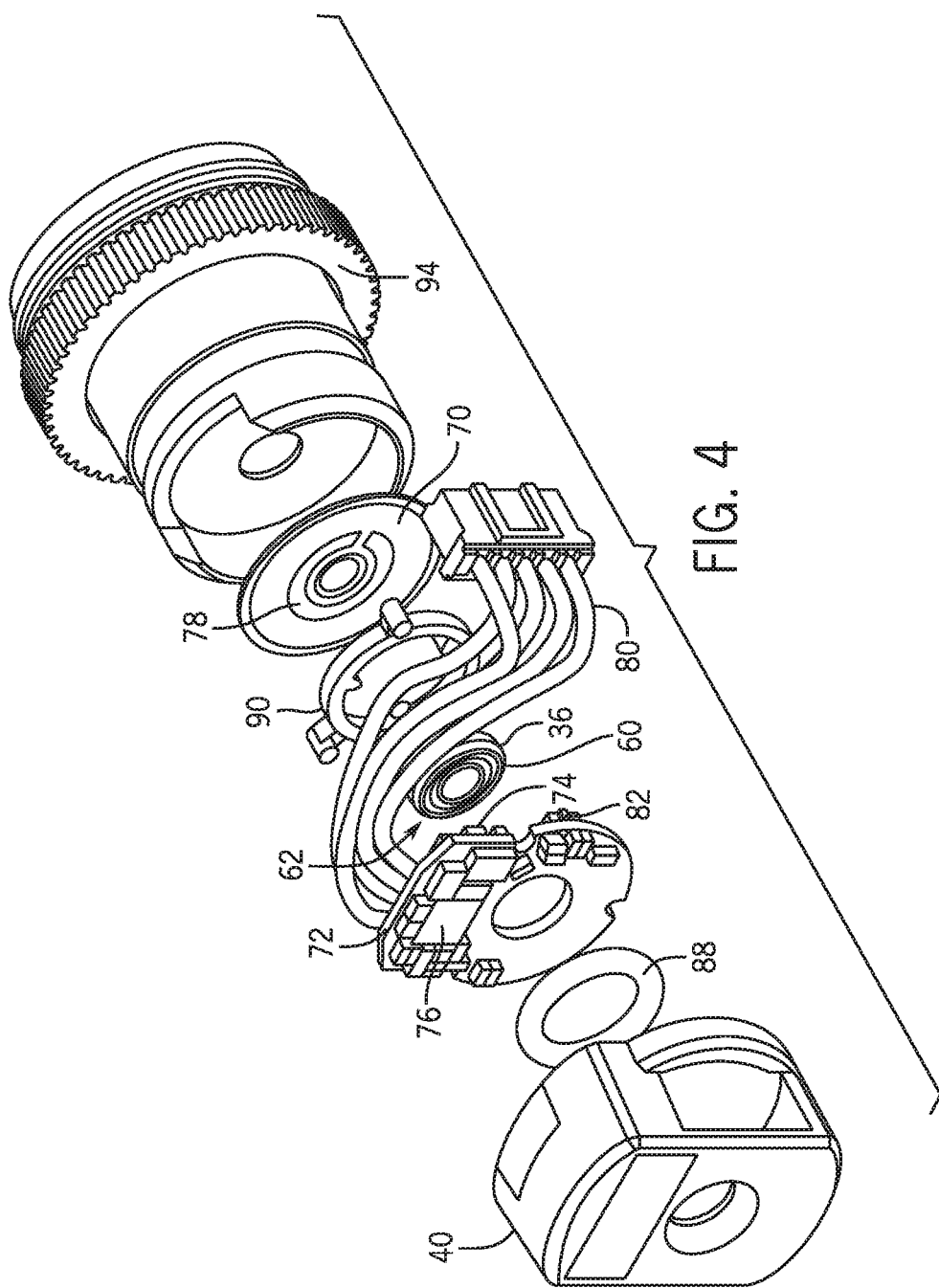
FIG. 4 is an exploded view illustrating an embodiment of a liquid lens and components of the reader device that are positioned in a thermal relationship to the liquid lens.

Referring now to FIG. 4, an embodiment is shown that can be used to significantly reduce or eliminate the focal drift in the liquid lens 36 by stabilizing the temperature of the liquid lens 36. In this embodiment, a portion of the housing 26 has been removed to provide an exploded view of the liquid lens 36 and components that are positioned in contact with and/or near the liquid lens 36. In this embodiment, the liquid lens 36 can be kept at a predetermined control temperature 60 while variations of an ambient temperature 62 can occur surrounding the reader 20. Data such as the predetermined control temperature values 61 and ambient temperature values 63 can be stored in memory 56 (see FIG. 5). The ambient temperature 62 can be measured at or near the liquid lens 36 within the housing 26, or the ambient temperature 62 can be measured outside of the reader 30, or both. The control temperature 60 can be maintained at a constant temperature and/or the control temperature can be maintained at a near constant temperature, e.g., within a range of several degrees. Further, the control temperature 60 can be maintained to be within an operating range of the liquid lens 36, e.g., minus 50 degrees Celsius to 70 degrees Celsius.

In some embodiments, the control temperature 60 can be maintained at or near the high end of the operating range, e.g., 70 degrees Celsius. Some liquid lenses change to a new focal distance quicker at higher temperatures. Therefore, maintaining the control temperature 60 at or near the high end of the operating range would not only provide an operating range of the reader 20 to be as large as possible, but would also serve to reduce or eliminate the drift and improve the focusing speed of the liquid lens 36 due to improved reaction time of the liquids in the liquid lens. It is contemplated that the control temperature 60 can be maintained at a low, or mid-range temperature, or any temperature within the operating range that is at or above the ambient temperature, for example.

Figure 5:
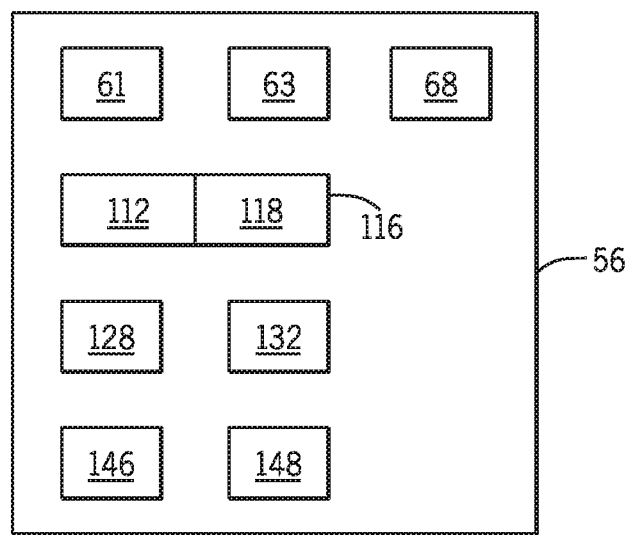
FIG. 5 is a schematic diagram illustrating values and data storable in memory.
Figure 6:
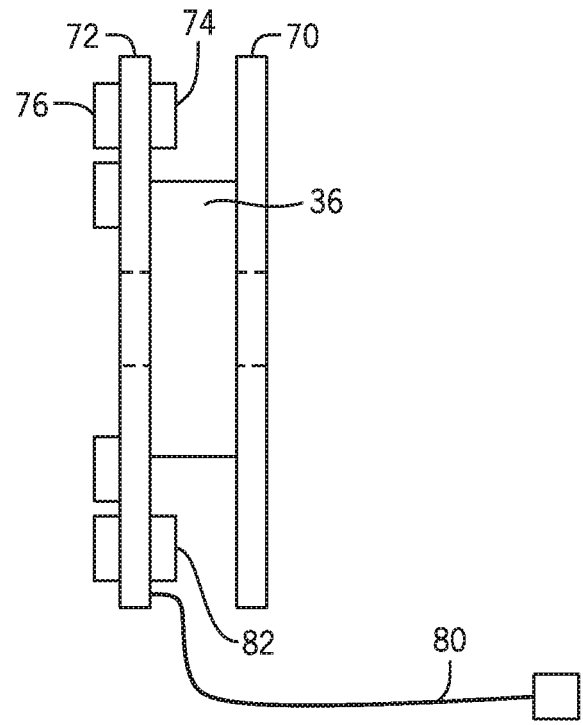
FIG. 6 is a side schematic view illustrating the liquid lens and circuit boards in contact with the liquid lens.

Referring now to FIGS. 4, 5 and 6, and by way of a non-limiting example, the liquid lens 36 can be positioned in thermal and/or physical contact with a first circuit board 70 or between, e.g., thermal and/or physical contact, the first circuit board 70 and a second circuit board 72. One or both of the first circuit board 70 and the second circuit board 72 can include a temperature sensor 74 as part of the control circuitry 76 for the liquid lens 36 and/or the reader 20. By way of example, the first circuit board 70 can include contacts 78 to electrically couple the control circuitry 76 to the liquid lens 36, and the control circuitry 76 on the second circuit board 72 can include liquid lens driver circuitry. A control cable 80 can extend from the second circuit board 72 to electrically connect the control circuitry 76 to the processor 50. A rubber ring 88 can be included to keep a constant pressure on one or both of the first circuit board 70 and a second circuit board 72 with the liquid lens 36 in-between. It is to be appreciated that other configurations and arrangement of components are contemplated.

In some embodiments, one or both of the first circuit board 70 and the second circuit board 72 can be made from a thermally conductive material. An exemplary thermally conductive material is Thermal Clad Insulated Metal Substrate developed by The Bergquist Company. Further, one or both of the first circuit board 70 and the second circuit board 72 can include a controllable heating element 82. The heating element 82 can be controlled to heat the circuit board it is on, e.g., the second circuit board 72, and to heat the ambient air at or near the liquid lens 36.

Figure 7:
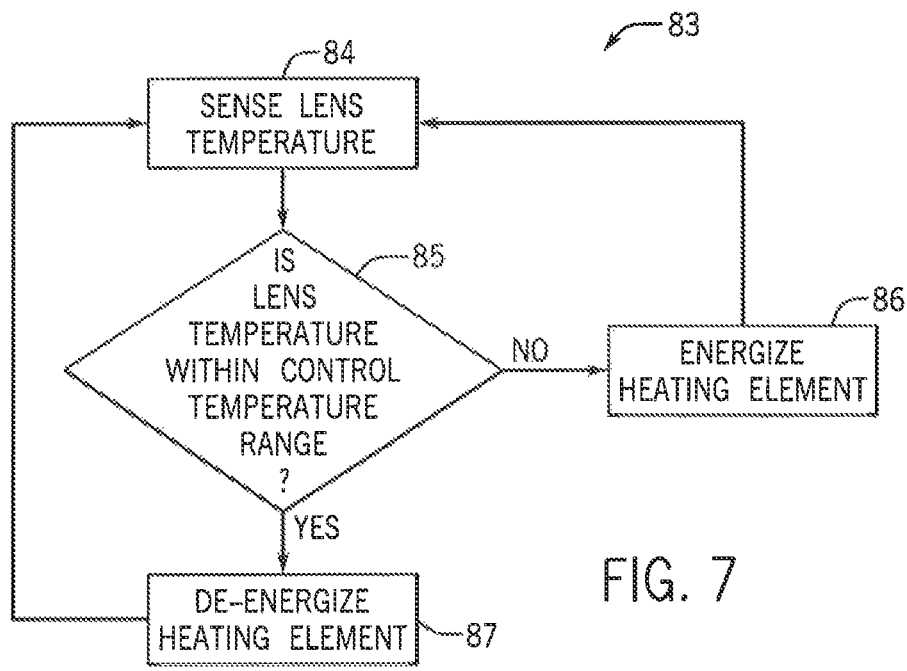
FIG. 7 is a flow chart of a method associated with controlling the temperature of the liquid lens.

In some embodiments, one or both of the first circuit board 70 and the second circuit board 72 can be in electrical, thermal and/or physical contact with the liquid lens 36. When in thermal contact, or physical contact, the heating element 82 can be controlled to generate a heat that thermally affects the liquid lens 36. Referring to FIG. 7, a method 83 is shown for controlling the temperature of the liquid lens. At process block 84, the temperature sensor 74 can sense a temperature value 132 associated with the liquid lens 36. At decision block 85, a feedback loop can compare the temperature value 132 to the control temperature 60. If the temperature value 132 is not at the control temperature 60 or within the control temperature range, at process block 86, the heating element 82 can be energized to increase the temperature of one or both of the first circuit board 70 and the second circuit board 72, and in turn, the temperature of the liquid lens 36. At process block 87, when the temperature value 132 is at the control temperature 60 or within the control temperature range, the heating element 82 can be de-energized, and the liquid lens properties can be maintained.

Additional reader 20 components, when assembled, can enclose the liquid lens 36 and the first circuit board 70 and the second circuit board 72. For example, a guide 90 and the lens housing 40 can physically and thermally enclose all or a portion of the liquid lens 36. Lens barrel 94 and the lens housing 40 can physically and thermally enclose all or a portion of the liquid lens 36 and the first circuit board 70 and the second circuit board 72. Guide 90 can serve to center the liquid lens 36 within the lens barrel 94. Any of the additional components, e.g., the rubber ring 88, the guide 90, the lens housing 40, and the lens barrel 94 can be further optimized for thermal insulation, e.g., by adjusting shape and material properties, in such way that only a minimum of power will be needed to keep the liquid lens 36 at the control temperature 60.

In an additional embodiment, the focal drift in the liquid lens 36 can be reduced or eliminated by stabilizing the temperature of the liquid lens 36. This embodiment can be used alone, or in combination with embodiments described above and shown in FIGS. 4 to 7.

Figure 8:
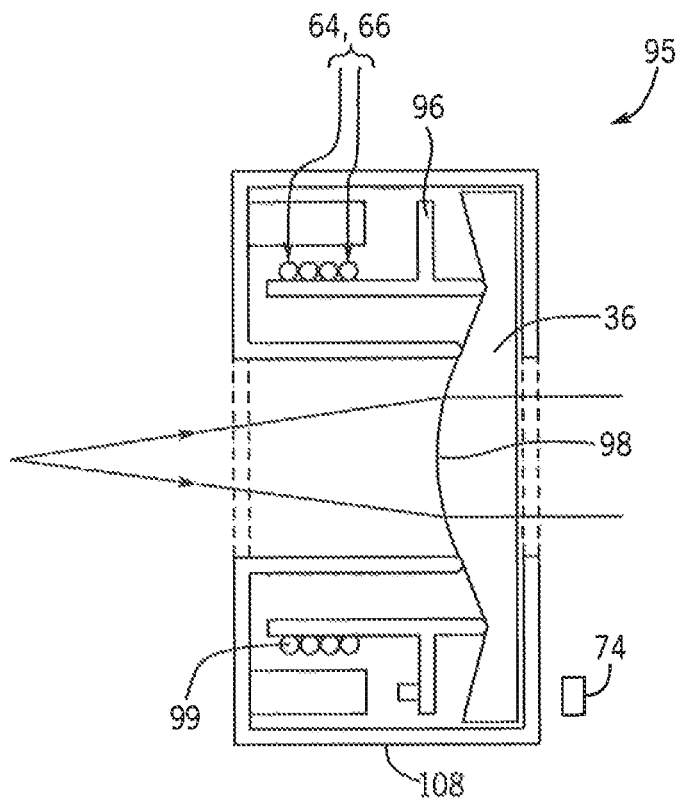
FIG. 8 is a side schematic view illustrating an additional embodiment of a liquid lens including an actuator, and circuit boards in contact with the liquid lens.

For example, other known adjustable lens configurations utilize electrical/mechanical actuator systems such as piezoelectric actuators, small motors, and electromagnetic actuators, e.g., a voice coil, to induce movement to control a lens or lenses, e.g., the meniscus of a liquid lens. In some embodiments, other variable lens elements are also used, for example, by changing the refractive index of a transparent material. FIG. 8 shows an exemplary variable lens 95. The variable lens 95 can include a ring shaped voice coil actuator 96 that is induced to press onto a transparent membrane 98 serving as a transparent sidewall of a container 108. The container is filled with liquid 36. A control signal 64 applied through the voice coil 99 induces the actuator 98 to apply a force to deform the membrane 98 into a convex shape. The convex shape acts as the liquid lens 36, and can be adjusted by adjusting the control signal 64. In these liquid lens configurations, the actuator 96 itself can induce temperature variations of the liquid lens 36 due to the control signal 64 applied to the actuator to change the focus of the liquid lens. The power dissipation in the actuator 96 is generally proportional to the square power of the control signal 64. For example, when the liquid lens 36 is driven to provide a high optical power, e.g., to focus in on a close symbol, more control current to the actuator 96 is required and the heat generation and associated dissipation from the liquid lens 36 is high. Conversely, when the liquid lens 36 is driven at a lower optical power, e.g., to focus in on a farther symbol, less control current to the actuator is required and the heat generation and associated dissipation from the liquid lens 36 is lower. In some applications, the induced temperature variations in the liquid lens 36 can be a challenge to accurately detect with the temperature sensor 74, as the thermal coupling between the actuator 96 and the liquid lens 36 is better, e.g., faster, than the thermal coupling between the liquid lens 36 and the temperature sensor 74. This is at least partially due to the physical contact with the liquid lens 36 and the actuator 96.

Accordingly, the undesirable actuator induced temperature variations in the liquid lens 36 can be controlled by controlling a bias signal 66 to the actuator 96. The bias signal 66 can be applied when the control signal 64 is not being applied to the actuator for adjustment of the focus of the lens for an image acquisition, thereby controlling the induced temperature variations and the associated induced drift effects. The bias signal 66 through the actuator can be controlled to reduce the temperature variations caused by internal heating and/or ambient temperature.

Figure 9:
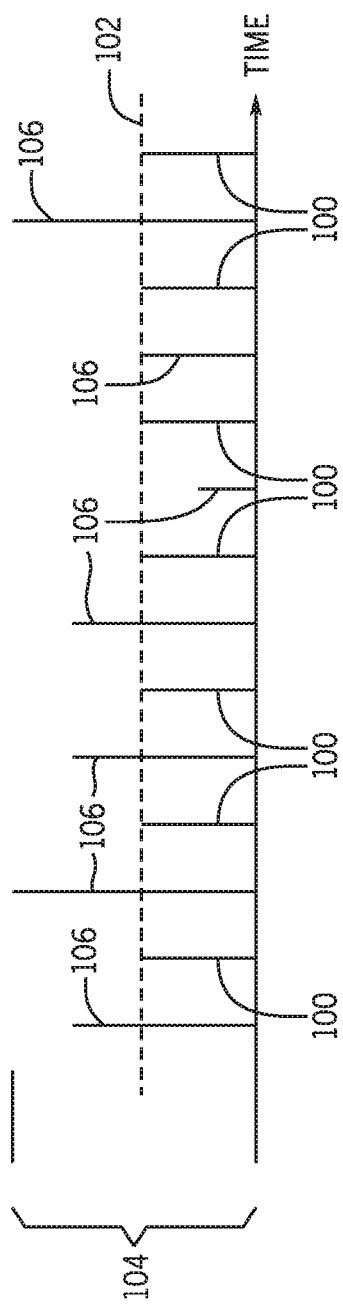

Referring to FIG. 9, liquid lenses are commonly operated where the liquid lens is driven to return to a default position 100, typically in the middle 102 of the focal range 104, after each focus operation 106. The default position 100 fails to consider any past operation of the liquid lens, e.g., if the liquid lens 36 was recently driven at a high focal power or a low focal power. As seen in FIG. 9, the liquid lens 36 was driven at a higher focal power more than it was driven at a lower focal power. This operation would typically increase the temperature of the liquid lens, thereby inducing drift effects and reducing the sharpness of acquired images.

Figure 10:
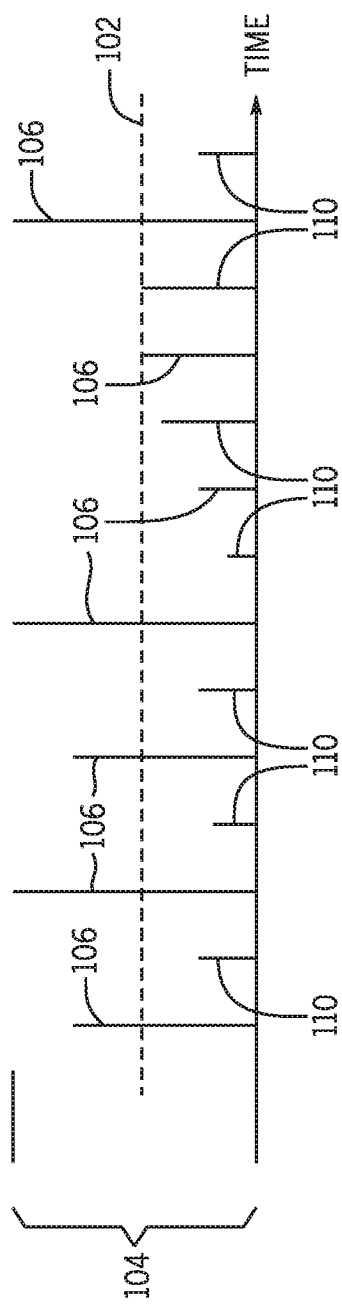
FIG. 10 is a chart similar to FIG. 9 and showing the same relative positions the liquid lens is driven to, and instead showing calculated return positions the lens is returned to for controlling the temperature of the liquid lens.

Referring to FIG. 10, instead, in some embodiments, the bias signal 66 to the actuator 96 can be controlled in such way that the average heat dissipation by the liquid lens 36 and actuator 96 is kept generally constant. Constant heat dissipation can equate to a constant temperature, and a constant temperature can equate to a reduction or no drift effects. For example, a history 68 of the liquid lens operation can be maintained in memory 56, and the processor 50 can instruct a return position based on an analysis of the past history. For example, if the liquid lens 36 was driven to the same focal powers as shown in FIG. 9, the processor can determine that the liquid lens 36 would increase in temperature. Instead of returning the liquid lens 36 to the middle of its focal range 102, the liquid lens 36 could be returned to a desired focal power position 110 with the bias signal 66, where the bias signal could be reduced enough to counterbalance the higher control signal 64 used for the higher focal powers. The processor 50 can manage the application of the bias signal 66 to the actuator 96 to average the current applied to the actuator to reduce the induced temperature variations and the associated induced drift effects.

Similarly, the bias signal 66 to the actuator 96 can be controlled in such a way that the bias signal is dependent on the measured temperature of the liquid lens 36 to reduce the induced temperature variations and the associated induced drift effects. For example, the liquid lens 36 can be driven with a bias signal 66 that temporarily decreases after the liquid lens 36 has been set to a high optical power for an image acquisition, and temporarily increases after the liquid lens has been set to a low optical power.

Figure 11:
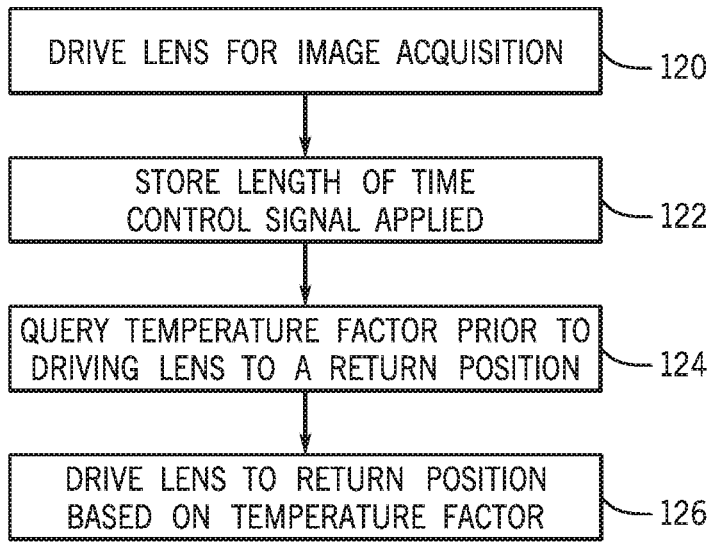
FIGS. 11, 12, and 13 are flow charts of methods associated with controlling the temperature of the liquid lens according to embodiments of the technology.

Referring to FIG. 11, method 114 shows where a temperature factor 116 is maintained and tracked for query by the processor 50. The temperature factor 116 can be a value associated with the amount of time a specific control signal 64 is applied to the liquid lens 36. In this example, the temperature factor 116 does not include a measured temperature value 132, although in some embodiments, a measured temperature value 132 may be included. When the liquid lens 36 is not being actively driven by the control signal 64 for an image acquisition, the processor 50 can adjust the bias signal 66 to compensate for the past control signal applied. At process block 120, the processor 50 drives the liquid lens 36 for a specific amount of time at a specific control signal 64 to acquire an image. At process block 122, a time value 112 for the specific amount of time the specific control signal is applied and a control value 118 for a specific control current can both be stored in memory 56 as elements of the temperature factor 116 (see FIG. 5). After the image has been acquired and the temperature factor 116 has been stored, the processor 50 can query the temperature factor 116 from memory, at process block 124, in order to compute a return position for the liquid lens, based on the temperature factor 116.

As a non-limiting example, if 100 milliamps of control signal 64 was applied to the actuator 96 for 10 milliseconds, the processor 50 can then determine that the liquid lens 36 should be driven with a bias signal 66 current of 10 milliamps for 100 milliseconds to lower the temperature of the liquid lens 36 to the control temperature 60. At process block 126, the processor 50 can then drive the liquid lens to the return position based on the analysis of the temperature factor 116. The method can repeat at process block 120.

Depending on when the liquid lens 36 is driven to a focal power during use of the reader 20, a counter 128 operable in memory 56 and controllable with the processor 50 can be included to count up or down to track the temperature factor. For example, the liquid lens 36 may be driven to a new position prior to the completion of the application of 10 milliamps for 100 milliseconds. The counter 128 can keep track of how much of the 10 milliamps for 100 milliseconds has been applied, and continue the application of the bias signal 66 after the liquid lens 36 has completed the image acquisition. It is to be appreciated that these are examples only, and many factors would affect specific bias signals and application times, as would be understood by one skilled in the art.

Figure 12:
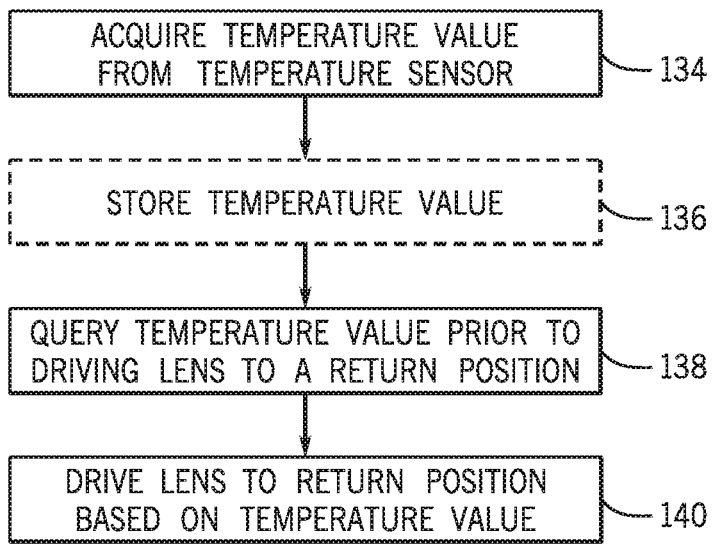

Referring to method 130 in FIG. 12, in some embodiments, the temperature sensor 74 can be read to provide a temperature value 132, and depending on the temperature value 132, alone or in combination with the temperature factor 116, the bias signal 66 can be controlled, i.e., reduced or increased bias signal, in an effort to maintain a consistent and/or predetermined control temperature 60. Use of the temperature sensor 74 has the benefit of including ambient or external temperatures affecting the reader 20, and specifically on the liquid lens 36. At process block 134, a temperature value 132 is acquired from the temperature sensor 74. Optionally, the temperature value 132 can be stored in memory 56 (see FIG. 5), at process block 136. After the image has been acquired and the temperature value 132 has been stored, the processor 50 can query the temperature value 132 from memory 56, at process block 138, in order to compute a return position for the liquid lens 36, based on the temperature value 132. At process block 140, the processor 50 can then drive the liquid lens 36 to the return position using a bias signal 66 based on the temperature value 132 and/or the temperature factor 116. In addition, in some embodiments, tracking the temperature factor 116 can be eliminated. The method can repeat at process block 134.

In some applications, the induced drift may not be able to be completely eliminated, such as when the reader device is subject to large ambient temperature swings, or the liquid lens 36 is operated in such a way that there is insufficient time to control the bias signal 66 to control the temperature of the liquid lens, for example. In these applications, the image sharpness can be determined over a series of images, alone or in combination with controlling the temperature of the liquid lens 36, to adjust a focal distance of the lens.

In most reader applications, a series of images is typically acquired. The series of images can be acquired either within one trigger, such as in a known continuous or manual mode, or over several triggers, such as in a known single trigger mode. An image acquisition parameter, e.g., a focal distance, can be changed by a predetermined small adjustment step 142 between each of the series of images. For one or more of the images in the series of images, the reader 20 can use a sharpness calculation 146 operable in memory 56 to determine a sharpness score 148 for each image. The sharpness score 148 from one image can be compared to a sharpness score from another image to determine the effect of the predetermined small adjustment step 142 between each of the images. The predetermined small adjustment step 142 can improve the sharpness score, or it can reduce the sharpness score, or the sharpness score can remain unchanged. Based on the comparison of the sharpness scores, the processor 50 can determine a direction, e.g., greater or less focal distance, for a next predetermined small adjustment step. In some embodiments, alone or in combination with the sharpness score 148, the processor 50 may also use the ambient temperature change, e.g., an increase or decrease in ambient temperature, to determine a direction of the predetermined small adjustment step 142.

Figure 13:
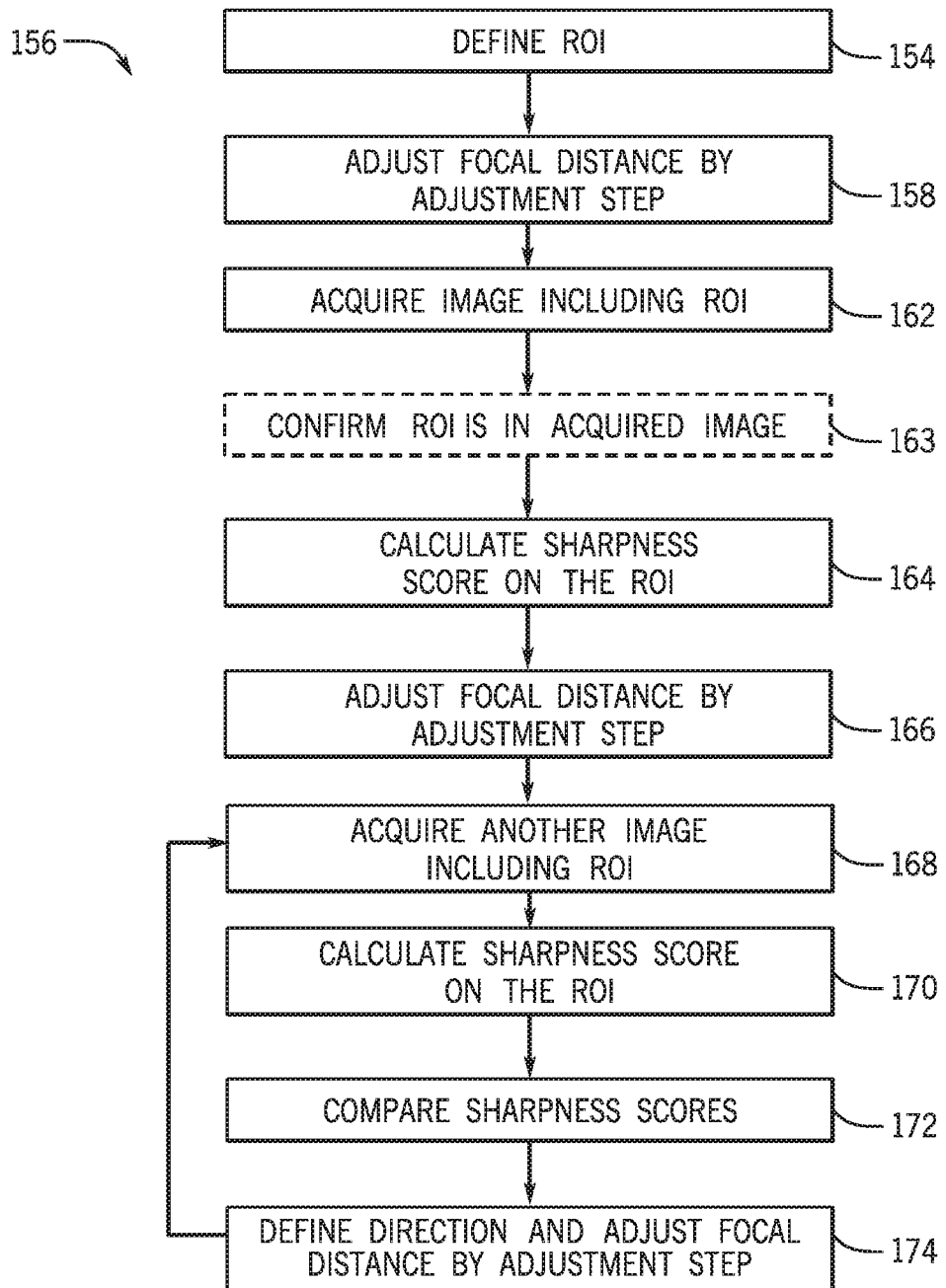

Referring to FIG. 13, in some embodiments, the sharpness calculation 146 can analyze a small region of interest (ROI) 152 within the field of view of one or more images. At process block 154 of method 156, the ROI 152 can either be defined automatically by a symbol, e.g., the barcode 22 as seen in FIG. 1, or the ROI can be defined by the user, e.g., the hashtag symbol 160 as seen in FIG. 1. For example, the sharpness calculation 146 process can be enabled by placing a known ROI 152, e.g., barcode 22 or symbol 160, within the field of view 42 for each image where a sharpness score 148 is going to be calculated. The focal distance of the adjustable lens 36 can be adjusted by the predetermined small adjustment step 142 at process block 158. At process block 162, an image can be acquired that includes the ROI 152. Optionally, the processor 50 can confirm the ROI 152 is in the acquired image, at process block 163. At process block 164, the processor 50 can then run the sharpness calculation 146 on the known ROI 152 identified in the images to generate a sharpness score 148 for the ROI 152 in the acquired image. Next, at process block 166, the focal distance of the adjustable lens 36 can again be adjusted by the predetermined small adjustment step 142. At process block 168, an additional image of the field of view that includes the ROI 152 can be acquired. Again, optionally, the processor 50 can confirm the ROI 152 is in the acquired image. At process block 170, the processor 50 can then run the sharpness calculation 146 on the known ROI 152 identified in the additional image to generate a subsequent sharpness score 148. The first sharpness score 148 can be compared to the subsequent sharpness score 148, at process block 172. Based on the comparison of the sharpness scores, at process block 174, the processor 50 can define a direction for the next predetermined adjustment step, and the focal distance of the adjustable lens 36 can be adjusted in the defined direction by the predetermined small adjustment step 142. The method can then repeat at process block 168 by acquiring another image including the ROI 152 and comparing the sharpness score with the previously calculated sharpness score.

To make sure that the reader 20 doesn't slowly focus away from the potentially small ROI 152 to the background due to drift, the predetermined small adjustment step to the focal distance can be limited. This can include limiting adjustments to one image acquisition parameter at a time, and/or limiting an amount of an adjustment to the one or more of the image acquisition parameters.

Although the present technology has been described with reference to preferred embodiments, workers skilled in the art will recognize that changes may be made in form and detail without departing from the spirit and scope of the technology. For example, the present technology is not limited to reducing temperature induced drift effects on a liquid lens used in a machine vision system, and may be practiced with other systems incorporating liquid lenses. For example, although a fixed-mount system is shown and described above, the machine vision system can be a hand-held system. In a hand-held system, the distance from the vision system to a symbol or character to be read can be known or determined, and under these circumstances, adjustment of the focus can, in some applications, be simplified.

The particular embodiments disclosed above are illustrative only, as the technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A vision system comprising:
an adjustable focus liquid lens having a field of view, a focus of the liquid lens being adjustable with a control signal applied to the liquid lens via a conductor for capture of an image, the focus being adjustable by varying a magnitude of a voltage or a current of the control signal;
a bias signal applied to the liquid lens via the conductor at a time when the liquid lens is not being adjusted with the control signal for capture of the image; and
the bias signal applied to the liquid lens to maintain a temperature of the liquid lens within several degrees of a particular operating temperature.

2. The vision system of claim 1, further including a processor operable to store a temperature factor in a memory.

3. The vision system of claim 2, wherein the processor is operable to analyze the temperature factor to generate the bias signal with a magnitude configured to maintain the temperature of the liquid lens within several degrees of the particular operating temperature.

4. The vision system of claim 2, wherein the temperature factor includes a time value for a specific amount of time the control signal is applied to the liquid lens, and the processor is operable to generate the bias signal based on the specific amount of time the control signal was applied.

5. The vision system of claim 2, wherein the temperature factor includes a control value for a specific current applied to the liquid lens, and the processor is operable to generate the bias signal based on the control value.

6. The vision system of claim 1, wherein the control signal comprises at least one of a control voltage and a control current.

7. The vision system of claim 1, further including a temperature sensor to measure a temperature value of the liquid lens.

8. The vision system of claim 7, further including a processor operable to analyze the temperature value to generate the bias signal to drive the liquid lens to the return position.

9. The vision system of claim 7, wherein the temperature value is stored in a memory.

10. The vision system of claim 1, wherein the bias signal is based on a history of the control signal applied to the liquid lens.

11. A method for reducing temperature drift effects in a liquid lens, the method comprising:
applying, via a conductor, a control signal having a first magnitude to the liquid lens having a field of view and a focus at a first time, wherein the control signal adjusts the focus of the liquid lens for capturing an image, the focus being adjustable by varying a magnitude of a voltage or a current of the control signal;
determining, based on the first magnitude, a second magnitude at which to apply a bias signal to maintain a temperature of the liquid lens within several degrees of a particular operating temperature;
applying, via the conductor, the bias signal having the second magnitude to the liquid lens at a second time between image captures, the focus being adjustable by varying a magnitude of a voltage or a current of the bias signal, wherein the bias signal controls a temperature of the liquid lens and directly adjusts the focus of the liquid lens; and
applying the control signal having a third magnitude to the liquid lens at a third time subsequent to the first time and the second time, wherein the third magnitude is different than the first magnitude and the second magnitude.

12. The method of claim 11, further including storing a temperature factor in a memory.

13. The method of claim 12, further including analyzing the temperature factor to determine the second magnitude at which to apply the bias signal to maintain the temperature of the liquid lens within several degrees of the particular operating temperature.

14. The method of claim 12, wherein the temperature factor includes a time value for a specific amount of time the control signal is applied to the liquid lens, the method further comprising determining the second magnitude at which to apply the bias signal based on the specific amount of time the control signal was applied.

15. The method of claim 12, wherein the temperature factor includes a control value for a specific current applied to the liquid lens, the method further comprising determining the second magnitude at which to apply the bias signal based on the control value.

16. The method of claim 11, wherein the control signal comprises at least one of a control voltage and a control current.

17. The method of claim 11, further including measuring a temperature value of the liquid lens.

18. The method of claim 17, further including storing the temperature value in a memory.

19. The method of claim 17, further including analyzing the temperature value to generate the bias signal to control the temperature of the liquid lens.

20. The method of claim 11, wherein the bias signal is based on a history of the control signal applied to the liquid lens.

* * * * *